United States Patent [19]
Atkinson et al.

[11] Patent Number: 4,928,642
[45] Date of Patent: May 29, 1990

[54] AUTOMATIC STARTING FLUID INJECTION APPARATUS AND METHOD

[75] Inventors: Robert W. Atkinson, Normal; John W. Crayton, Washington; James I. Portscheller, Sparland; Daniel C. Wood, East Peoria, all of Ill.

[73] Assignee: Caterpillar Inc., Peoria, Ill.

[21] Appl. No.: 367,999

[22] Filed: Jun. 19, 1989

[51] Int. Cl.$^5$ .................. F02D 41/06; F02N 17/08
[52] U.S. Cl. .......................... 123/180 R; 123/180 E; 123/180 T
[58] Field of Search .......... 123/179 G, 179 L, 180 R, 123/180 AC, 180 E, 180 T, 187.5 R, 576

[56] References Cited

U.S. PATENT DOCUMENTS

| | | | |
|---|---|---|---|
| 3,847,130 | 11/1974 | Miyoshi et al. | 123/179 G |
| 3,960,131 | 6/1976 | Davis | 123/180 R |
| 4,202,309 | 5/1980 | Burke | 123/180 R |
| 4,346,683 | 8/1982 | Burke | 123/180 R |
| 4,522,164 | 6/1985 | Fränkle et al. | 123/180 R |
| 4,774,916 | 10/1988 | Smith | 123/180 R |

OTHER PUBLICATIONS

"Electronic Starting Fluid System for Improved Cold Starts"—Diesel Progress Engines & Drives—Aug., 1989.

Primary Examiner—Andrew M. Dolinar
Attorney, Agent, or Firm—Joseph W. Keen; Kirk A. Vander Leest

[57] ABSTRACT

Automatic starting fluid injection systems are useful, for example, to aid in the cold-starting of diesel engines. In the subject invention, a microprocessor under software control is used to controllably inject starting fluid into an engine passageway, such as an intake manifold. During engine cranking, the microprocessor delivers an injection signal to a fluid delivery system to effect starting fluid injection into the engine passageway. When the engine starts, a subsequent injection time is calculated based on the sensed engine temperature. The microprocessor continues to deliver the injection signal to the fluid delivery system during the subsequent injection time.

8 Claims, 7 Drawing Sheets

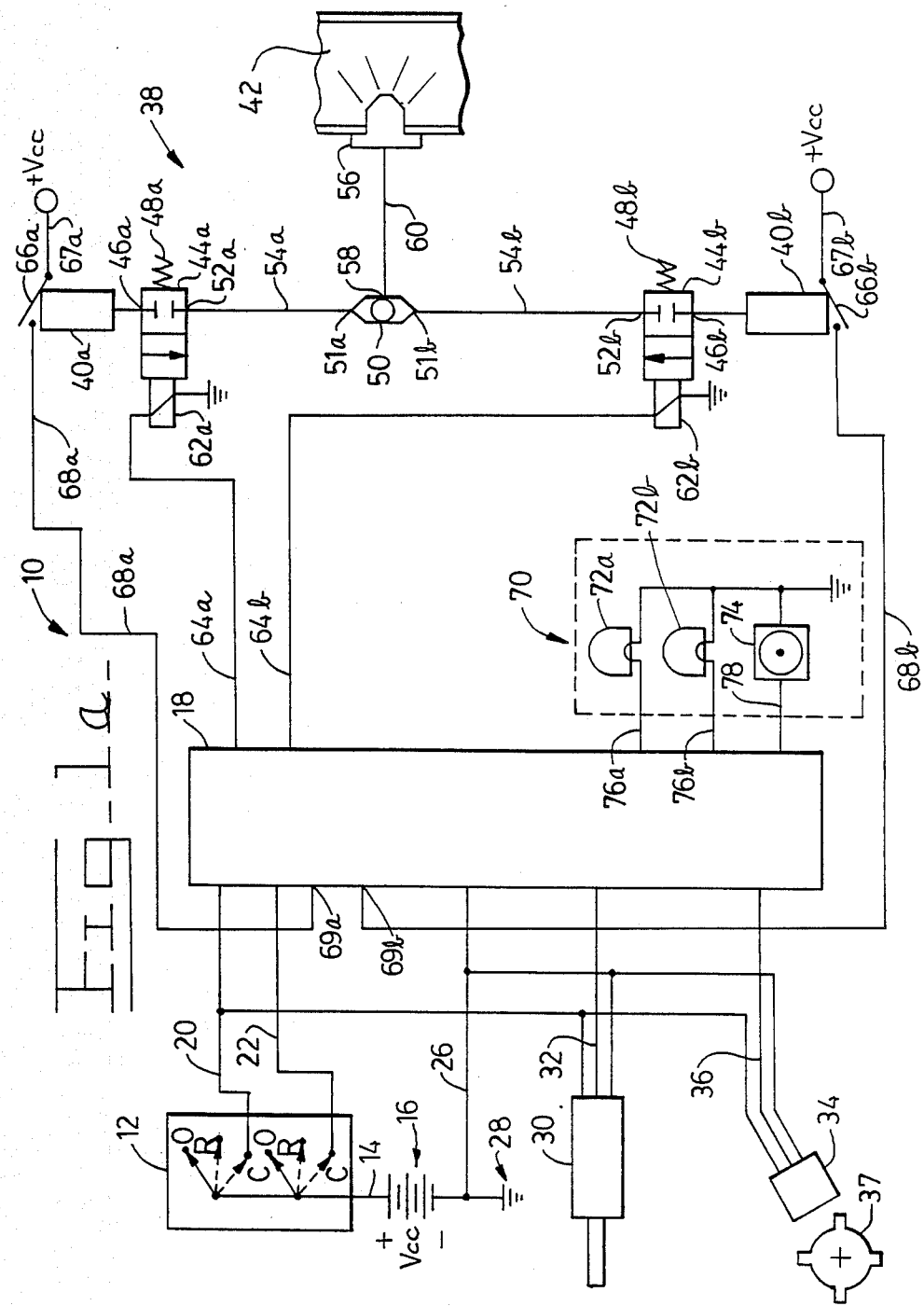

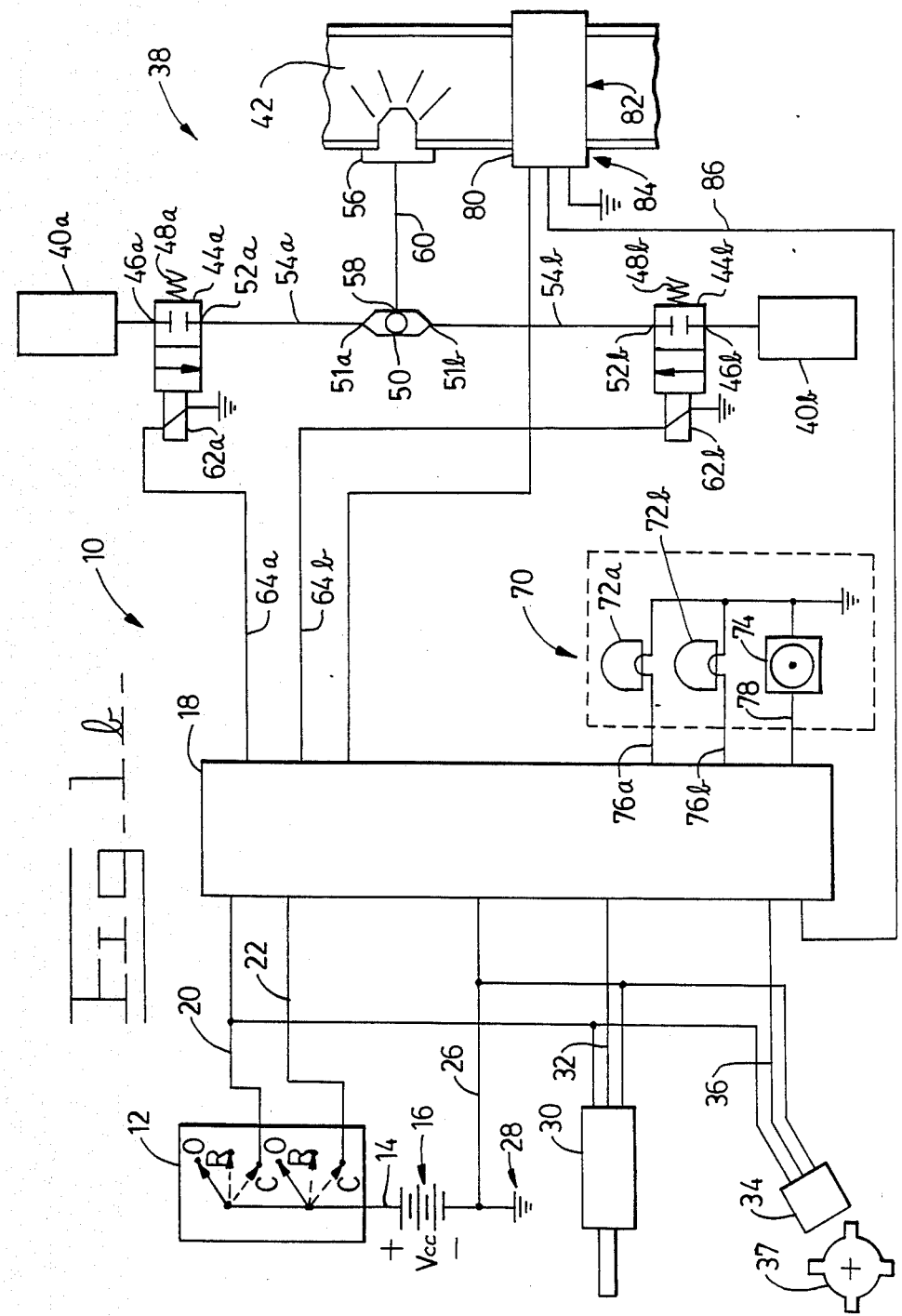

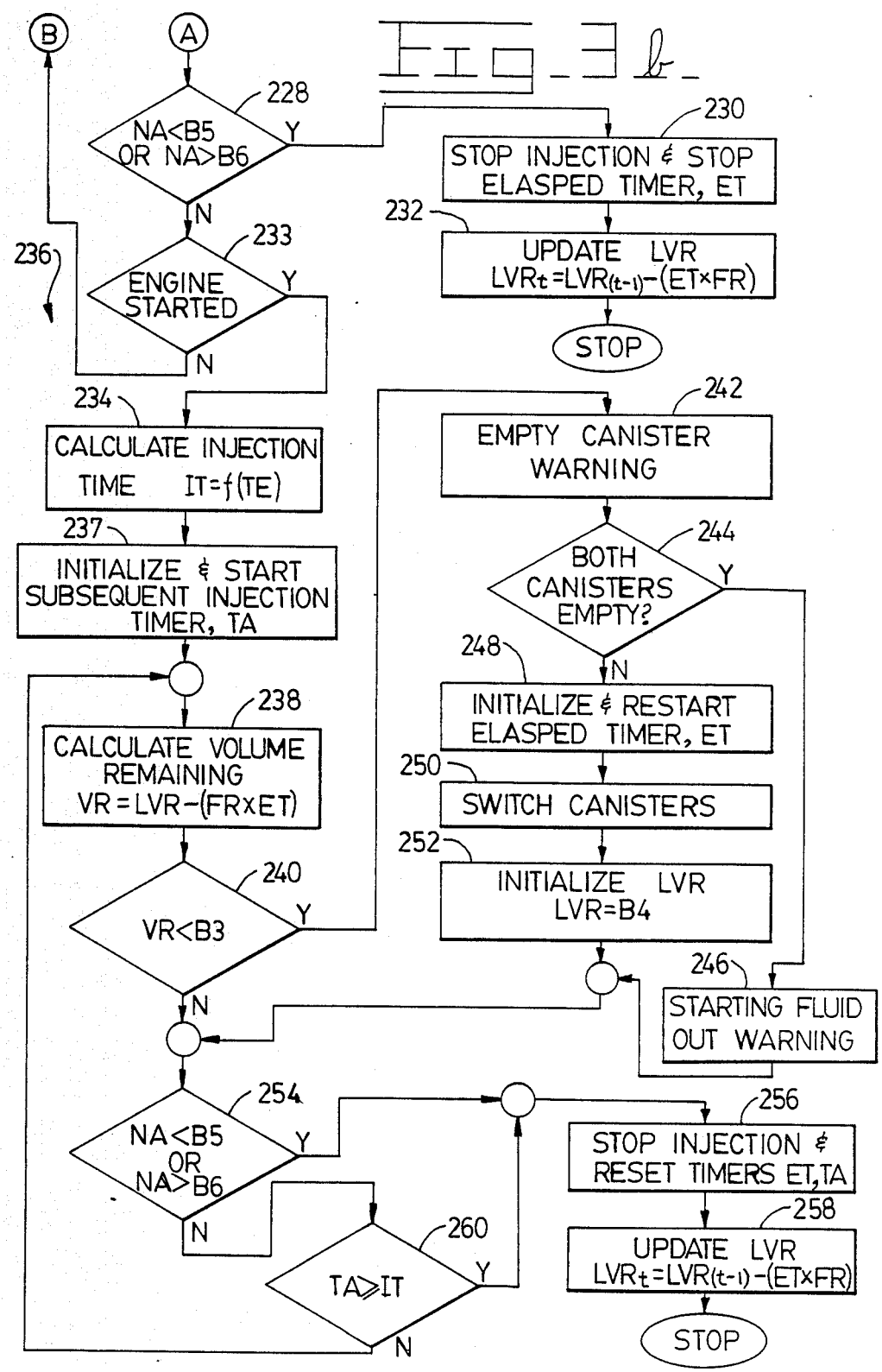

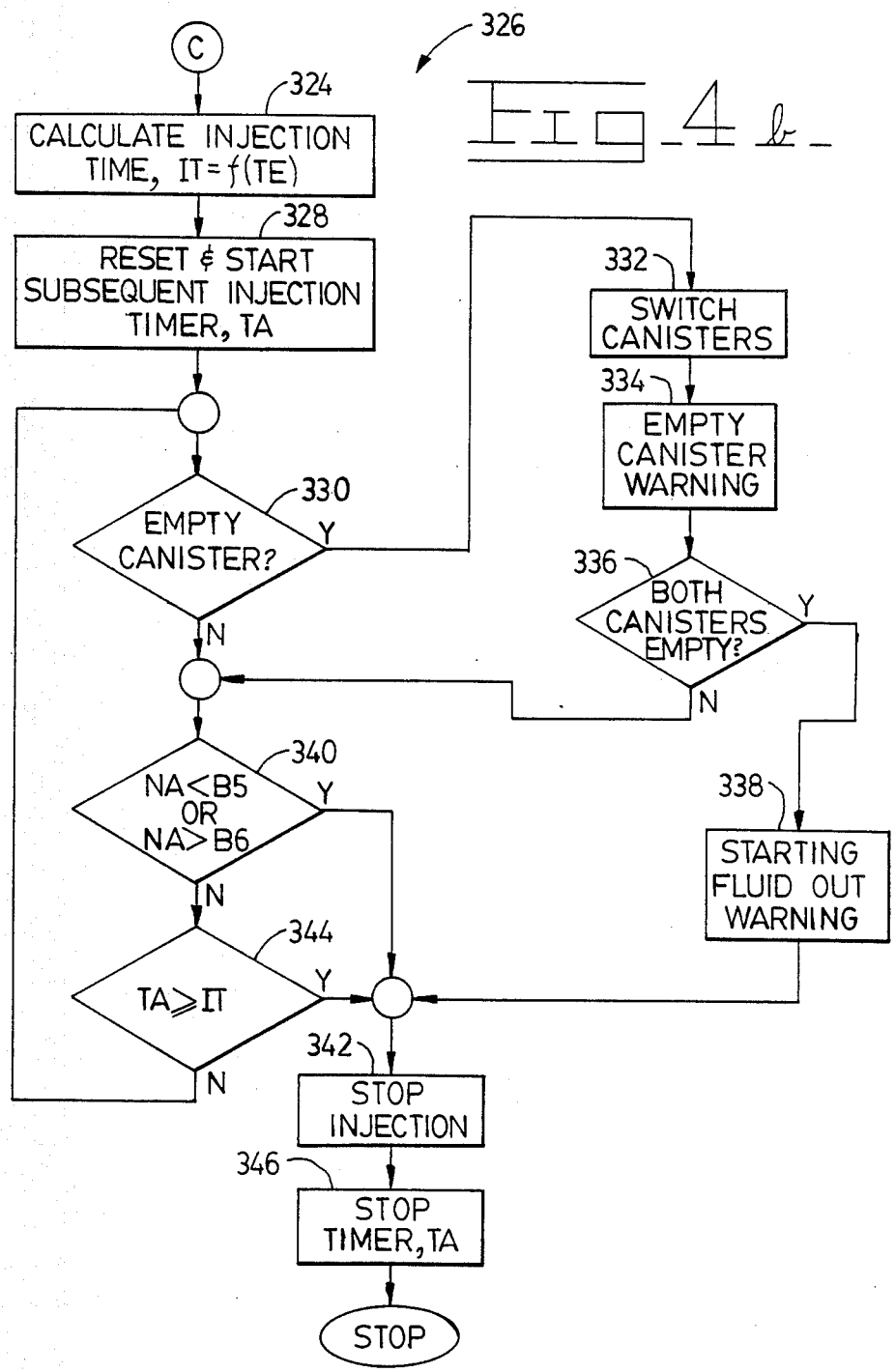

AUTOMATIC STARTING FLUID INJECTION APPARATUS AND METHOD

TECHNICAL FIELD

The present invention relates to a system for automatically injecting starting fluid into a passageway of an internal combustion engine and, more particularly, to an injection system that continuously injects starting fluid during engine cranking and subsequently, after the engine starts, injects starting fluid for a calculated period of time based on one or more engine parameters.

BACKGROUND

Starting fluids, such as ether, have long been used to aid in cold weather starting of internal combustion engines. Typically, liquid ether is injected into an inlet air stream, such as an intake manifold, where it vaporizes upon contact with the cold air. The air/ether charge is then combined with fuel during fuel injection into an engine combustion chamber. Ether lowers the temperature at which the mixture in the combustion chamber will ignite and thus shortens the ignition delay period. Engines usually run best when combustion begins before the piston reaches top dead center in the cylinder. Under cold start conditions without ether, ignition occurs late in the combustion cycle, or the combustible mixture may not ignite at all. Late ignition can cause a rapid rise in the cylinder pressure and result in serious engine damage. If one or more engine cylinders fails to ignite, the remaining cylinders carry an additional load which results in high pressures in the load-carrying cylinders. Engines are designed to operate below a maximum or peak pressure, and exceeding this limit can cause premature engine failure.

Typically, manual systems are used for starting fluid injection. More particularly, a vehicle operator simply uses an on/off switch to activate starting fluid injection whenever desired. Since these manual systems rely on operator activation, injection is highly unreliable and erratic. For example, it is possible for an excessive amount of starting fluid to be injected into an engine combustion chamber prior to engine cranking. If this occurs, serious engine damage can result when the combustible mixture ignites in the combustion chamber.

Several automatic systems have been developed to better control starting fluid injection. One such system is disclosed in U.S. Pat. No. 4,774,916 which issued on Feb. 11, 1987 to Smith. In Smith, a predetermined volume of starting fluid is repeatedly injected into an engine intake manifold during engine cranking. Injection of the starting fluid stops when the starter is no longer energized.

However, to eliminate white smoke from engine exhaust and to ensure smooth running during engine warm up, it is desirable to continue injection for a period of time after the engine starts. White smoke occurs when engine exhaust contains unburned fuel and it is both functionally and aesthetically desirable to eliminate white smoke from the engine exhaust. Injecting the starting fluid during this post-crank period lowers the flash point of the air/fuel mixture in the engine combustion chamber, thereby causing the fuel to burn more completely.

One injection system which provides this desirable post-cranking injection is disclosed in U.S. Pat. No. 4,202,309 which issued on July 20, 1978 to Burke. In Burke, starting fluid is continuously injected during engine cranking and a predetermined amount of fluid is subsequently injected from a reservoir when cranking ceases. Unfortunately, if an attempt to start the engine fails, the system still injects the predetermined amount when cranking stops. A subsequent attempt to start the engine can result in engine damage due to an excess amount of starting fluid in the combustion chamber. Furthermore, if the engine starts successfully, the volume of starting fluid subsequently injected is constant and therefore can be excessive or insufficient to solve the aforementioned problems.

The present invention is directed toward addressing the above mentioned problems by continuously injecting starting fluid during engine cranking and subsequently, after the engine starts, injecting starting fluid for a period of time based on one or more engine parameters. If the engine fails to start, injection ceases immediately thereby preventing excessive starting fluid injection. Other aspects, objects and advantages can be obtained from a study of the drawings, the disclosure, and the appended claims.

DISCLOSURE OF THE INVENTION

In accordance with one aspect of the present invention there is provided an apparatus for automatically injecting starting fluid into a passageway of an internal combustion engine. A speed sensor produces a speed signal in response to the speed of the engine. A temperature sensor produces a temperature signal in response to the temperature of the engine. A processor receives the temperature and speed signals, calculates an injection time in response to the engine temperature signal, and produces an injection signal in response to the speed signal for a period of time equal to said calculated injection time. An fluid delivery system receives the injection signal and injects the starting fluid in response to the injection signal.

BRIEF DESCRIPTION OF THE DRAWINGS

FIG. 1a is a schematic illustration of one embodiment of the immediate starting fluid injection system.

FIG. 1b is a schematic illustration of another embodiment of the immediate starting fluid injection system.

FIGS. 3a and 3b are flowcharts of certain functions performed by one embodiment of the immediate starting fluid injection system.

FIGS. 4a and 4b are flowcharts of certain functions performed by an alternate embodiment of the immediate starting fluid injection system.

BEST MODE FOR CARRYING OUT THE INVENTION

Figure 2:
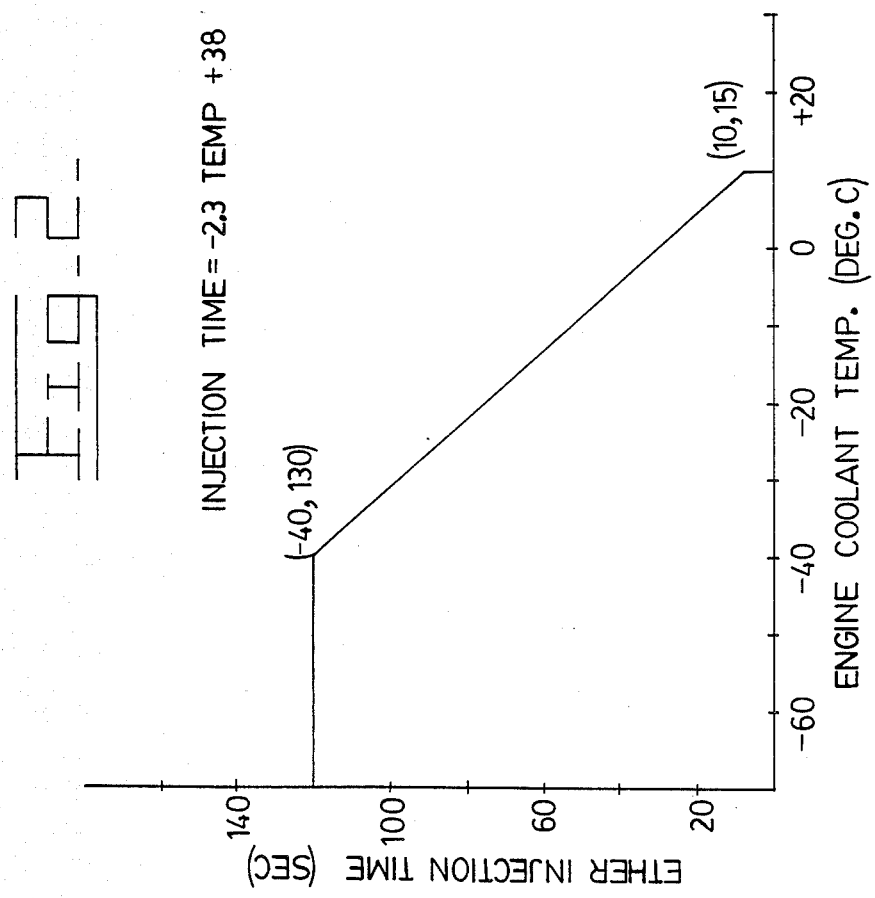
FIG. 2 is a graph of injection time versus engine coolant temperature.

Referring now to FIG. 1, an embodiment of the immediate starting fluid injection system 10 is described for use with a diesel engine (not shown.) A manually operated three-position switch 12 is connected by an electrical conductor 14 to an electrical power source 16 such as a battery having a potential of $+V_{cc}$. The switch 12 is movable between "off", "run" and "crank" positions as denoted by "O", "R" and "C", respectively, and is biased from the "crank" to the "run" position by a return spring (not shown). The switch is shown in the "off" position but is movable to the "run" and "crank" positions as illustrated by the dashed lines in FIG. 1. When the switch 12 is in the "crank" position, electrical power is delivered to a starter (not shown) which cranks the engine to induce starting. The switch 12 is further connected to a programmable logic device, for example a microprocessor 18, by a pair of electrical conductors 20, 22.

Electrical power is delivered to the microprocessor 18 via the electrical conductor 20 when the switch 12 is in the "run" or "crank" positions and further via the electrical conductor 22 when the switch 12 is in the "crank" position, thereby activating the microprocessor 18. The microprocessor 18 is also connected by an electrical conductor 26 to a source of low electrical potential 28 such as the negative terminal of a battery or chassis ground. The microprocessor 18 can be any one of numerous commercially available microprocessors; however, in the preferred embodiment the microprocessor 18 is a model HC11 manufactured by Motorola Inc. of Phoenix Ariz. The microprocessor 18 is programmed to selectively control delivery of the starting fluid to the engine in response to sensed parameters, as described later.

An engine coolant sensor 30 is electrically connected to the switch 12, the microprocessor 18, and the source of low electrical potential 28 by electrical conductors 20, 32, 26, respectively. In the preferred embodiment the coolant sensor 30 produces a digital temperature signal on the conductor 32 in response to the engine coolant temperature; however, it is foreseeable and within the scope of the invention to use a sensor that produces a pulse-width-modulated or analog signal, for example. Furthermore, sensing coolant temperature as opposed to engine block temperature, for example, is desirable for improved accuracy and is considered more representative of "engine temperature". In the preferred embodiment, the coolant sensor 30 is capable of accurately measuring coolant temperatures ranging from $-40$ C. to $+121$ C. Sensors of this type are common in the art; therefore, a more detailed description is not provided herein.

An engine speed sensor 34 is connected to the switch 12, the microprocessor 18, and the source of low electrical potential 28 by respective electrical conductors 20, 36, 26. The speed sensor 34 can be any type of sensor that accurately produces an electrical signal in response to engine crankshaft speed. However, in the preferred embodiment, the speed sensor 34 is mounted on an engine flywheel housing (not shown) and produces a digital speed signal on the electrical conductor 36 in response to the speed of a flywheel 37 mounted on the engine crank shaft (not shown). Engine speed as referred to hereinafter is the speed of the engine crankshaft in revolutions per minute (rpm). Furthermore, in the preferred embodiment, the speed sensor 34 is capable of accurately measuring engine speed over a range from 15 to 2000 rpm.

A fluid delivery system 38 includes a pair of pressurized canisters 40a, 40b containing starting fluid such as ether. Two canisters 40a, 40b are provided to reduce the likelihood of running out of starting fluid during an injection cycle. An injection cycle, as referred to hereinafter, is the cycle of injection starting when engine cranking begins and ending when injection is stopped, as explained below. The fluid delivery system 38 injects starting fluid into an engine passageway 42, such as an intake manifold, in response to an injection signal produced by the microprocessor 18. The fluid delivery system 38 further includes a pair of solenoid operated valves 44a, 44b. The solenoid operated valves 44a, 44b have intake ports 46a, 46b coupled to respective canisters 40a, 40b, respectively. Each of the solenoid operated valves 44a, 44b is normally biased to a "closed" position by a return spring 48a, 48b.

A pressure-actuated shuttle valve 50 has intake ports 51a, 51b connected to exit ports 52a, 52b of the solenoid operated valves 44a, 44b by respective fluid conduits 54a, 54b. Shuttle valves of this type are common in the art and therefore will not be described in detail herein. An injection nozzle 56 is disposed in the engine passageway 42 for dispensing starting fluid into the passageway 42. The injection nozzle 56 is connected to an exit port 58 of the shuttle valve 50 by a fluid conduit 60.

A pair of solenoids 62a, 62b are provided for controlling the solenoid operated valves 44a, 44b, respectively, in response to the injection signal produced by the microprocessor 18. More particularly, the solenoids 62a, 62b are mechanically connected to the respective solenoid operated valves 44a, 44b, and electrically connected to the microprocessor 18 by respective electrical conductors 64a, 64b. The microprocessor 18 controllably delivers an injection signal to the solenoids 62a, 62b over the electrical conductors 64a, 64b to effect starting fluid injection into the engine passageway 42.

A pair of electrical switches 66a, 66b are connected to the source potential $+V_{cc}$ by respective electrical conductors 67a, 67b and further to the microprocessor 18 by respective electrical conductors 68a, 68b. Each switch 66a, 66b is associated with one of the canisters 40a, 40b, respectively. The switches 66a, 66b are advantageously positioned to be open when the canisters 40a, 40b are in place, as shown. When one of the canisters 40a, 40b is removed, the corresponding switch 66a, 66b closes and electrical power is delivered to the microprocessor 18 via the respective conductor 68a, 68b. More specifically, the conductors are connected to separate input ports 69a, 69b of the microprocessor 18 such that the microprocessor 18 is activated whenever one of the canisters 40a, 40b is removed. When the microprocessor 18 is activated in this manner, the microprocessor memory is updated to indicate that the canister 40a, 40b has been replaced.

A warning system 70 is electrically connected to the microprocessor 18 for providing a warning when one or both of the pressurized canisters 40a, 40b is empty. In the preferred embodiment, the warning system 70 includes first and second warning lights 72a, 72b cooperatively associated with the first and second canisters 40a, 40b, respectively, and an audio warning device 74 such as a buzzer. The microprocessor 18 selectively delivers electrical signals on the electrical conductors 76a, 76b in response to receiving an empty canister signal, thereby activating the light 72a, 72b corresponding to the empty canister 40a, 40b. In the event that both canisters 40a, 40b are empty, the microprocessor 18 produces electrical signals on all the conductors 76a, 76b, 78 thereby simultaneously activating both lights 72a, 72b and the audio warning device 74.

Industrial Applicability

Timed Method

Figure 3A:
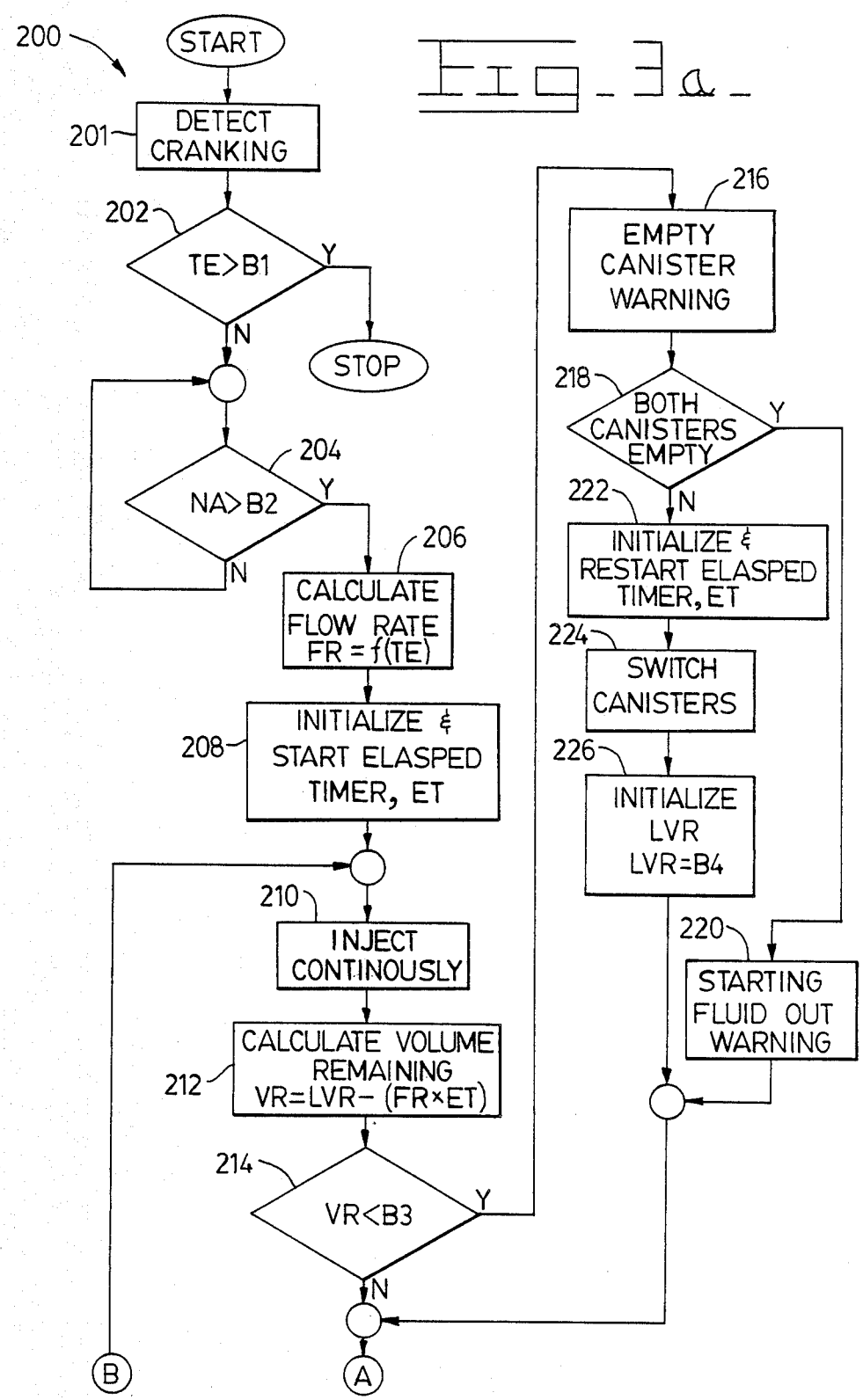

Referring now to FIGS. 3a and 3b, an embodiment of software for controlling the microprocessor 18, hereinafter referred to as the timed method, is illustrated by a flowchart. The microprocessor 18 is activated whenever the key switch 12 is positioned in either the "run" or "crank" positions. At times when the microprocessor 18 is activated and starting fluid is not being injected, the microprocessor 18 is switched to a "passive" mode wherein all input and output circuits are monitored for fault conditions.

Subsequent to microprocessor activation, an injection routine 200 begins. In the first step of the injection routine 200, the switch 12 is monitored in the block 201 to determine if the engine is cranking. More particularly, when the key switch 12 is in the crank position, the conductor 22 is at the source voltage potential $+V_{cc}$.

The microprocessor 18 remains in the passive mode until engine cranking is detected in the block 201, at which time control is passed to the decision block 202. In the decision block 202 the engine temperature TE is determined by monitoring the coolant sensor 30. Subsequently, the engine temperature TE is compared to a predetermined bias B1. If the engine temperature TE is greater than the bias B1, the injection routine 200 stops and the microprocessor 18 returns to the "passive" mode. Otherwise, control is passed to the decision block 204. In the preferred embodiment, the bias B1 is set at 10° C.; however, it is foreseeable that other values can be selected for the bias B1.

In the decision block 204, the engine speed sensor 34 is monitored to determine engine speed NA. The engine speed NA is continuously monitored in this manner until it exceeds a preselected bias B2, thereby preventing starting fluid injection at engine speeds NA below the bias B2. Otherwise, if injection is allowed as soon as the key switch 12 reaches the "crank" position, it is possible for an excessive amount of starting fluid to be injected prior to engine cranking and ignition. If this occurs, an excessive amount of starting fluid can be injected into the engine. When the mixture in the combustion chamber subsequently ignites, engine damage can result as previously explained. In the preferred embodiment, the bias B2 is set to 30 rpm; however, depending on the operational characteristics of the engine in question other values can be selected for the bias B2.

When the engine speed NA reaches the bias B2, control is passed to the block 206 where a starting fluid flow rate FR is calculated as a function of the engine coolant temperature TE. More particularly, a look-up table in microprocessor memory is accessed to determine a flow rate FR through the nozzle 56 for the measured engine temperature TE. Because the rate of flow through the injection nozzle 56 varies with temperature by as much as a factor of three, a constant flow rate FR cannot be assumed. The look-up table is empirically determined by measuring starting fluid flow rates through the nozzle 56 over a range of operating temperatures. The flow rate FR is used to calculate the volume of starting fluid remaining in a canister 40a, 40b, as explained below.

In the block 208 an elapsed time timer ET is initialized to zero and started. The elapsed time ET is used in conjunction with the flow rate FR to calculate the volume remaining in the canister 40a, 40b currently being used for injection.

Subsequently, starting fluid injection begins in the block 210. More particularly, the microprocessor 18 selectively produces the injection signal on one of the conductors 64a, 64b thereby actuating the respective solenoid controlled valve 44a, 44b. One of the canisters 40a, 40b is repeatedly utilized for injection until it is empty, at which time the other canister 40a, 40b is thereafter utilized for injection. This strategy assures that a supply of starting fluid is always available during the injection cycle.

Thereafter, in the block 212, the volume remaining VR in the canister 40a, 40b currently in use is calculated using the following equation:

$$VR = LVR - (FR * ET)$$

where VR is the volume remaining in the canister 40a, 40b, LVR is the volume remaining after the last injection cycle, FR is the flow rate through the nozzle 56, and ET is the elapsed time for the current injection cycle. In the preferred embodiment the canisters 40a, 40b each have an initial volume of 810 ml; therefore, the last volume remaining LVR is initially set to 810 and is updated at the end of each injection cycle. This strategy assures that a supply of starting fluid is always available during injection.

In the decision block 214, the volume remaining VR is compared to a preselected bias B3 to determine if the canister 40a, 40b being used for injection is empty. In the preferred embodiment the bias B3 is calculated as a function of the engine coolant temperature TE and flow rate FR. More particularly, the engine coolant temperature TE is used to determine the flow rate FR, as explained previously. Subsequently, the volume of starting fluid that would be injected over a two minute time period at the flow rate FR is calculated. The bias B3 is set to this calculated volume, thereby assuring that, at a minimum, the canister 40a, 40b contains a two minute supply of starting fluid.

If the canister 40a, 40b currently being utilized for injection is empty, control is passed to the block 216 where an empty-canister flag is set in microprocessor memory for that canister 40a, 40b. More particularly, a current-use flag is set in microprocessor memory for the canister 40a, 40b currently being utilized for injection. When the canister 40a, 40b currently being used for injection is empty, an empty-canister flag is set for that canister 40a, 40b and the microprocessor memory is updated such that the other canister 40a 40b is thereafter used for injection. Furthermore, the light 72a, 72b associated with the empty canister is activated. More specifically, the microprocessor 18 produces a high potential signal on the conductor 76a, 76b associated with the empty canister, thereby activating the respective warning light 72a, 72b.

Subsequently, control is passed to the decision block 218 to determine if both canisters 40a, 40b are empty. If empty-canister flags are set for both the canisters 40a, 40b, control is passed to the block 220 causing the microprocessor 18 to produce high potential signals on the conductors 76a, 76b, 78, thereby activating both of the warning lights 72a, 72b and the audio warning device 74. In the preferred embodiment, injection continues even if both canisters 40a, 40b are empty; however, the software and vehicle hardware can be modified to shut down the engine, for example, when this situation occurs. Injection is allowed to continue in this instance because a safety factor is included in the flow rate FR calculation; therefore, the canister 40a, 40b could still contain a small supply of starting fluid.

If the other canister 40a, 40b is not empty, control is passed to the block 222. In the block 222, the elapsed timer ET is initialized and restarted. Thereafter, in the block 224, the microprocessor memory is updated such that other canister 40a, 40b becomes the current-use canister. In the block 226, the last volume remaining LVR is set to a Bias B4 which corresponds to the volume of a full canister 40a, 40b. As mentioned previously, the canisters 40a, 40b have a volume of 810 ml in the preferred embodiment.

Control is then passed to the decision block 228 where the engine speed NA is compared to a pair of predetermined biases B5, B6. If the engine speed NA is less than the bias B5 or greater than the bias B6, control is passed to the block 230 causing injection to stop. The bias B5 is selected such that injection stops whenever the engine speed falls below a preselected speed. In the preferred embodiment, the bias B5 is set at 15 rpm; however, other values can be chosen for this bias. This strategy prevents starting fluid from being injected into a stalled engine. The bias B6 is selected such that injection stops if the engine speed NA exceeds a preselected value. This is done to prevent engine overspeed which occurs when too much fuel is being injected into the engine. In the preferred embodiment, the bias B6 is set at 2000 rpm; however, it is foreseeable to select different values for this maximum engine speed.

If either of these conditions is meet, control is passed to the block 230 causing injection to stop. Thereafter, in the block 232, the variable last volume remaining LVR is updated using the following equation:

$$LVR_t 32 LVR_{(t-1)} - (ET*FR)$$

where $LVR_t$ is the volume remaining in the current-use canister 40a, 40b after the present injection cycle and $LVR_{(t-1)}$ is the volume remaining after the previous injection cycle.

If neither of these conditions is met, control is passed to the decision block 233 to check if the engine has started. To determine if the engine has started, the switch 12 and speed sensor 34 are simultaneously monitored. If the switch 12 is in the "on" position and the speed sensor 34 is producing a speed signal greater than the bias B2, it is assumed that the engine has started. When the engine starts, control is passed to the block 234 which forms part of a subsequent-injection control loop 236.

The subsequent-injection control loop 236 functions to inject starting fluid for a period of time based on engine temperature TE subsequent to the engine starting. More specifically, a subsequent injection time IT is calculated in the block 234 using the following injection formula:

$$IT = 38 - (2.3*TE)$$

where TE is the measured engine temperature. The injection formula follows the curve illustrated in FIG. 2 and is empirically determined for a specific engine. As mentioned previously, if ignition of the air/fuel mixture occurs late in the combustion cycle, a rapid rise in cylinder pressure can occur and result in serious engine damage. Starting fluid, and ether in particular, lower the temperature, and therefore the time, at which the air/fuel mixture in the cylinder will ignite. The amount of time that starting fluid needs to be injected at a given temperature to prevent rapid pressure rises and ensure smooth starting is determined by monitoring engine cylinder pressure during starting at that particular temperature. Starting fluid is injected for a period of time sufficient to ensure the cylinder pressure does not exceed the maximum pressure allowable for safe engine operation. These measurements are repeated over a variety of temperatures and integrated to generate a table of engine temperature TE versus injection time IT.

Thereafter, a subsequent injection timer TA is initialized to zero and started in the block 237. The blocks 238 to 252, are the same as the blocks 212 to 226 and serve to reduce the likelihood of running out of starting fluid during injection. Subsequently, control is passed to the decision block 254 where the engine speed NA is compared to the biases B5 and B6 as explained above. If engine speed exceeds the bias B6 or falls below the bias B5, control is passed to the block 256 causing injection to stop and then to the block 258 where the variable last volume remaining LVR is updated. Otherwise, control is passed to the block 260 where the subsequent-injection timer TA is compared to the calculated injection time IT. If the subsequent injection timer TA is less than the calculated injection time IT, injection continues and control is returned to the decision block 238. Injection continues as previously described until the subsequent injection timer TA equals or exceeds the calculated injection time IT. When this occurs, control is passed to the block 256 causing injection to stop.

Sensor Method

Figure 4A:
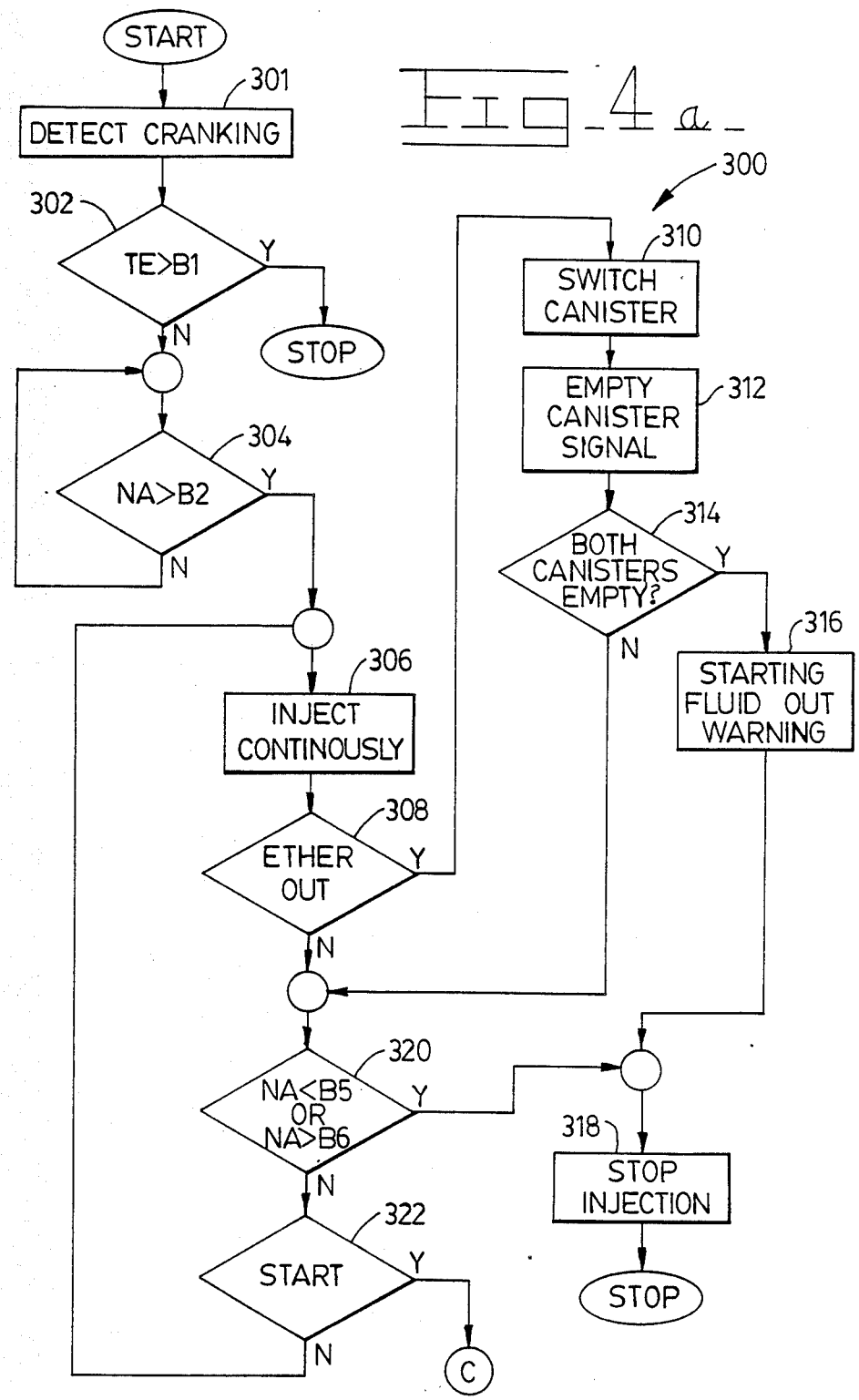

Referring now to FIGS. 1a, 4a and 4b, an alternate embodiment of the injection system 10 and associated software for controlling the microprocessor are discussed. This embodiment differs from the previously described embodiment with respect to determining when the canisters 40a, 40b are empty. This embodiment, hereinafter referred to as the sensor method, utilizes a starting sensor 80 preferably located in the air intake manifold 42 at a location downstream from the injection nozzle 56. In the preferred embodiment, the starting fluid sensor 80 includes a resistive element 82 disposed in the manifold 42. The electrical resistance of the element 84 changes in response to the presence or absence of starting fluid in the passageway 42. A conditioning circuit 84 is electrically connected to the resistive element 82 and produces a pulse-width-modulated signal having a duty cycle responsive to the resistance of the element 82. This signal is then delivered to the microprocessor 18 via an electrical conductor 86. It is foreseeable that this function could also be performed by sensing d(flow)/dt, d(pressure)/dt, etc. in the fluid conduit 60.

Continuing with the discussion of FIGS. 4a and 4b, the blocks 301 to 306 can be understood by referring to the previous description of blocks 201, 202, 204, and 210 in FIG. 3a. In the decision block 308, the starting fluid sensor 80 is monitored to determine if the pressurized canister 40a, 40b currently being utilized is empty. If the canister 40a, 40b is empty, control is passed to the block 310 causing the microprocessor 18 to deliver the injection signal to the other canister 40a, 40b. As in the timed method, a current-use flag is set in microprocessor memory for the canister 40a, 40b currently being used for injection. When a canister becomes empty, an empty-canister flag is set in microprocessor memory for that canister 40a, 40b and the microprocessor is updated such that the other canister 40a, 40b becomes the current use canister.

Thereafter, in the block 312, the microprocessor produces a high signal on one of the conductors 74a, 74b, thereby activating the warning light 72a, 72b associated with the empty canister 40a, 40b.

In the decision block 314, the starting fluid sensor 80 is again monitored to determine if the new current-use canister is also empty. If both canisters 40a, 40b are empty, control is passed to the block 316 causing the microprocessor 18 to produce a high signal on the conductors 76a, 76b, 78 thereby activating both of the warning lights 72a, 72b and the audio warning device 74. Subsequently, control is passed to the block 318 causing injection to stop.

If the new current-use canister is not empty, control is passed to the decision block 320. The remaining portion of the flowchart can be understood by referring the previous descriptions of the blocks 228, 233, 234 254, 256 and 260 of the timed method and the blocks 310 to 316 of the sensor method.

We claim:

1. An apparatus for automatically injecting starting fluid into a passageway of an internal combustion engine, comprising:
   speed sensor means for producing a speed signal in response the speed of said engine;
   temperature sensor means for producing a temperature signal in response to the temperature of said engine;
   processor means for receiving said temperature and speed signals, calculating an injection time in response to said engine temperature signal, and producing an injection signal in response to said speed signal for a period of time equal to said calculated injection time; and,
   fluid delivery means for receiving said injection signal and injecting said starting fluid into the engine passageway in response to said injection signal.

2. The apparatus set forth in claim 1 including:
   means for cranking said engine;
   means for producing a cranking signal in response to said engine cranking; and,
   wherein said processor means continuously produces said injection signal in response to simultaneously receiving said cranking and engine speed signals and subsequently produces said injection signal for said calculated injection time in response to receiving said speed signal absent said cranking signal.

3. The apparatus set forth in claim 1, wherein said fluid delivery means includes:
   pressurized canister means for containing said starting fluid;
   an injection nozzle mounted in said engine passageway; and,
   a solenoid operated valve having an intake port coupled to said pressurized canister means, an exit port coupled to said injector nozzle, and being adapted to receive said injection signal and inject said starting fluid into said engine passageway in response to said injection signal.

4. The apparatus set forth in claim 1, wherein said fluid delivery means includes:
   an injection nozzle mounted in said engine passageway;
   first and second pressurized canister means for containing said starting fluid;
   first and second solenoid operated valves valves having first and second intake ports respectively fluidly coupled to said first and second pressurized canister means, first and second exit ports fluidly coupled to said injection nozzle, and being adapted to receive said injection signal and regulate flow between said intake and exit ports in response to said injection signal;
   detector means for producing an empty canister signal in response to one of said first and second pressurized canisters being empty wherein said processor means controllably delivers said injection signal to one of said first and second solenoid operated valves and upon receiving said empty canister signal controllably delivers said injection signal to the other solenoid operated valve.

5. The apparatus set forth in claim 4 wherein said detector means includes:
   a sensor disposed in said engine passageway and being adapted to produce said empty signal in the absence of said starting fluid.

6. The apparatus set forth in claim 4, wherein said detector means includes:
   timer means internal to said processor means for accumulating the amount of time that said one solenoid operated valves receives said injection signal and producing an accumulated time signal in response to said accumulated time; and
   wherein said processor means receives said accumulated time and temperature signals, calculates the volume of starting fluid remaining in one of said pressurized canisters in response to said temperature and accumulated time signals, and produces said empty signal in response to said calculated volume being less than a preselected reference.

7. An apparatus for automatically injecting pressurized starting fluid into a passageway of an internal combustion engine, comprising:
   a three position switch having off, crank, and run positions;
   switch sensor means for producing crank and run signals in response to said switch being in said crank and run positions, respectively;
   speed sensor means for producing a speed signal in response to the speed of said engine;
   temperature sensor means for producing a temperature signal in response to the temperature of said engine;
   processor means for receiving said speed and crank signals, producing an injection signal in response to said speed and crank signals, receiving said run signal and temperature signals, and thereafter producing said injection signal for a period of time based on said temperature signal and in response to receiving said run signal; and,
   fluid delivery means for receiving said injection signal and injecting said starting fluid into the engine passageway in response to said injection signal.

8. A method for automatically injecting starting fluid into a passageway of an internal combustion engine, comprising the steps of:
   sensing the speed of said engine;
   sensing the temperature of said engine;
   calculating an injection time in response to said sensed engine temperature; and,
   injecting said starting fluid for said calculated injection time in response to said sensed engine speed.

* * * * *